US009330160B2

(12) United States Patent
Wadhwani et al.

(10) Patent No.: US 9,330,160 B2
(45) Date of Patent: May 3, 2016

(54) SOFTWARE APPLICATION COMPLEXITY ANALYSIS

(71) Applicant: Bank of America Corporation, Charlotte, NC (US)

(72) Inventors: Rajat Wadhwani, Closter, NJ (US); Timothy Guerry, Cornelius, NC (US); Bridget E. O'Connor, Holmdel, NJ (US); Erik Dahl, Newark, DE (US); Andy Kerestes, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 173 days.

(21) Appl. No.: 14/227,876

(22) Filed: Mar. 27, 2014

(65) Prior Publication Data

US 2015/0278336 A1    Oct. 1, 2015

(51) Int. Cl.
*G06F 17/30*    (2006.01)
(52) U.S. Cl.
CPC ................................ *G06F 17/30595* (2013.01)
(58) Field of Classification Search
CPC combination set(s) only.
See application file for complete search history.

(56) References Cited

U.S. PATENT DOCUMENTS

| 6,128,773 A | 10/2000 | Snider .............................. 717/4 |
| 7,003,766 B1 | 2/2006 | Hong ........................... 717/144 |
| 7,472,037 B2 | 12/2008 | Brown et al. ................. 702/182 |
| 7,739,652 B2 | 6/2010 | Lake ............................. 717/101 |
| 2009/0138843 A1* | 5/2009 | Hinton ....................... G06F 8/74 717/101 |

FOREIGN PATENT DOCUMENTS

| JP | 2001125782 | 5/2001 | ............... G06F 9/06 |
| KR | 20030041040 | 11/2001 | ............. G06F 17/30 |

* cited by examiner

Primary Examiner — Etienne Leroux
(74) Attorney, Agent, or Firm — Michael A. Springs

(57) ABSTRACT

An apparatus of one embodiment analyzes application complexity based on complexity factors. The apparatus includes a memory and a processor. The memory stores raw values associated with a software application, each raw value associated with a respective complexity factor, which is associated with a respective scoring metric. The memory also stores scoring metrics, which indicate how preliminary scores are calculated. The memory also stores preliminary scores associated with the software application. The processor determines the raw values by determining a respective raw complexity value for each of the complexity factors. The processor also calculates the preliminary scores by calculating a respective preliminary score for each of the complexity factors. The respective preliminary score for each complexity factor is calculated by applying the respective scoring metric to the respective raw value. The processor also calculates a total score based at least on the plurality of preliminary scores.

20 Claims, 3 Drawing Sheets

SOFTWARE APPLICATION COMPLEXITY ANALYSIS

TECHNICAL FIELD OF THE INVENTION

The present invention relates generally to the field of software and more particularly to software application complexity analysis.

BACKGROUND OF THE INVENTION

Many different types of software applications can be developed to perform certain functions within companies or other organizations. Companies can develop software applications as products or services offered to customers, and companies can also develop multiple interconnected software applications to provide internal services. Software applications can have different levels of complexity that can drive costs, inefficiencies, or other problems. However, it may be difficult to characterize or evaluate this complexity and to identify how the different aspects of software complexity affect costs, upkeep, user experiences, or other outcomes. Furthermore, the complexity of certain software applications can change over time, making it difficult to monitor the complexity of software applications as they develop and change.

SUMMARY OF THE DISCLOSURE

In accordance with the present invention, certain disadvantages and problems associated with software application complexity analysis may be reduced or eliminated.

According to one embodiment, an apparatus analyzes application complexity based on complexity factors. The apparatus includes a memory and a processor communicatively coupled to the memory. The memory stores raw values associated with a software application, each raw value associated with a respective complexity factor. Each complexity factor is associated with a respective scoring metric. The memory also stores scoring metrics, which indicate how preliminary scores for respective complexity factors are calculated. The memory also stores preliminary scores associated with the software application. The processor determines the raw values by determining a respective raw complexity value for each of the complexity factors. The processor also calculates the preliminary scores by calculating a respective preliminary score for each of the complexity factors. The respective preliminary score for each complexity factor is calculated by applying the respective scoring metric to the respective raw value. The processor also calculates a total score based at least on the plurality of preliminary scores.

Certain embodiments of the invention may provide one or more technical advantages. A technical advantage of one embodiment is improved determination of software application complexity. Some embodiments provide an objective, normalized mechanism for evaluating complexity that improves the comparison of the complexity of different types of software applications. Such embodiments allow organizations to more quickly and efficiently identify software applications that tend to cause detrimental effects as a result of their complexity. Such embodiments may also provide an improved mechanism for identifying software applications that are likely to cause problems in the future. These embodiments may therefore reduce costs and facilitate improved operational efficiency. Furthermore, some embodiments provide a repeatable mechanism for evaluating and quantifying software application complexity, which enables improved tracking of software application complexity over time. Some embodiments also provide a streamlined, automated mechanism for assessing the likely impact of changing multiple interconnected software applications. These embodiments provide a more efficient mechanism for identifying potentially problematic software, which simplifies the development of software improvement plans.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE DRAWINGS

Embodiments of the present invention and its advantages are best understood by referring to FIGS. 1 through 4, like numerals being used for like and corresponding parts of the various drawings.

Some embodiments of the present disclosure provide improved determination, tracking, and comparison of software application complexity. Software application complexity can be driven, characterized, and identified in different ways. As used herein, a "complexity factor" refers to an aspect of a software application that tends to be positively correlated with complexity and that can be objectively evaluated and scored. For example, the number of users, total cost, and age are examples of complexity factors that can be scored to provide insight into application complexity. Certain embodiments determine raw complexity values associated with different complexity factors and then calculate preliminary complexity scores for each complexity factor based on a predetermined scoring metric. The scoring metric of each complexity factor determines how the raw complexity values are translated into preliminary scores, and these metrics can be dynamically generated based on existing sets of raw complexity values associated with other applications. The preliminary complexity scores may be weighted based on predetermined weights for each complexity factor, and these scores are combined to generate a total complexity score.

Analyzing software application complexity in this manner provides an objective, repeatable mechanism for evaluating and comparing the complexity of different types of software applications. Such analysis allows organizations to more quickly and efficiently identify software applications that tend to cause detrimental effects as a result of their complexity. This analysis may also provide an improved mechanism for identifying software applications that are likely to cause problems in the future. Certain embodiments may therefore reduce costs and facilitate improved operational efficiency. Furthermore, the objective, repeatable mechanism for evaluating and quantifying software application complexity also provides an improved system for tracking software application complexity over time, which may also reduce costs and improve efficiency.

Figure 1:
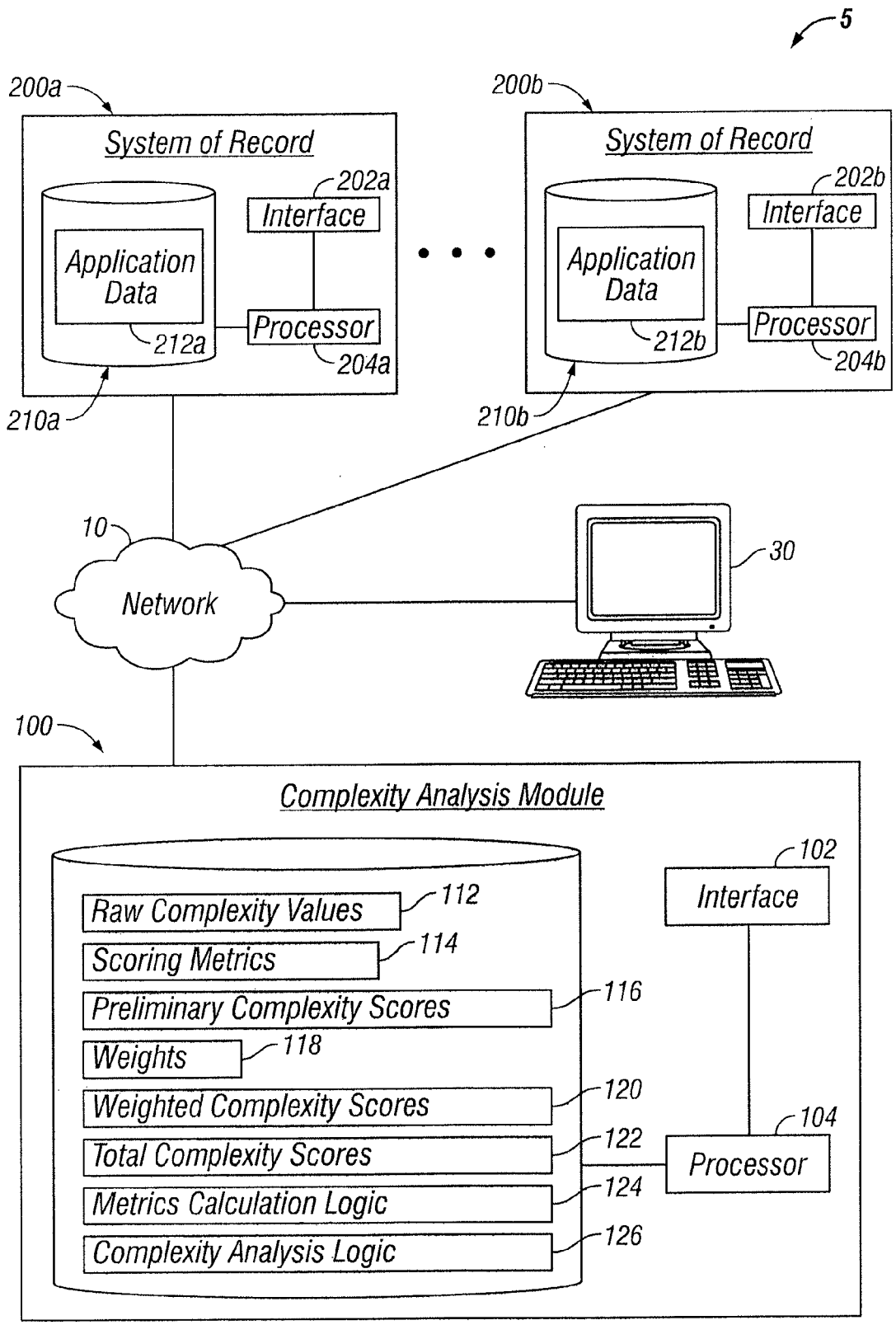
FIG. 1 illustrates an example system that performs software application complexity analysis.

FIG. 1 illustrates an example system that performs software application complexity analysis. System 5 includes complexity analysis module 100, which communicates with systems of record 200 and workstation 30 through network 10.

Software applications may include software that is designed or implemented from scratch; software "updates" that involve adding to, deleting, or modifying existing software; or any other type of software. Software applications encompass source code, compiled code, or any other type of software, and software applications may be written in any software language or format. Furthermore, software applications may have a development phase, during which one or more aspects of the program are still being developed, and a production phase, during which the software application is operating in a production environment to provide its intended end-use. In some cases, software development may still occur after a software application enters into the production stage. Complexity analysis module 100 may analyze the complexity of any suitable number or type of software applications.

System 5 analyzes software application complexity based on multiple complexity factors. Any suitable number or type of complexity factors can be used. Some embodiments may use one or more of the following complexity factors: users (indicating a number of users associated with a software application), age (indicating the amount of time a software application has been in development, production, or both), and errors (indicating a number of times a software application has caused errors or the rate of such errors). For example, software applications that have larger numbers of users, have been used or developed for longer periods of time, or generate greater numbers of errors tend to be more complex. Other examples of complexity factors include transactions (indicating a number or rate of transactions processed by a software application), software changes (indicating a number or rate of changes to the code of a software application), languages (indicating a number of languages associated with a software application), and products (indicating a number of products associated with a software application). For example, software applications that process more transactions, have been more frequently updated, or impact greater numbers of products tend to be more complex. Other examples of complexity factors include instances (indicating a number of instances of a software application), locations (indicating a number of buildings, organizations, or geographical locations using a software application), and affected applications (indicating a number of software applications affected by changes to a software application such as, for example, other applications that are communicatively connected to the software application). For example, software applications that have more instances running, operate in more locations, or affect more applications tend to be more complex. Still other examples of complexity factors include cost (indicating the total monetary costs associated with a software application or a subset of that cost such as labor costs, marginal costs, overhead costs, development costs, or other types of costs), hardware (indicating a number of hardware devices utilizing a software application), and a resource usage (indicating an amount of resources used by a software application). For example, software applications that cost more, utilize more pieces of hardware, or utilize more computing resources tend to be more complex. Other embodiments may use complexity factors related to software dependencies, related projects, operational functions, up-time requirements (e.g., what percentage of time the application must be actively running), or any other suitable factor. Certain embodiments use some, all, or none of these complexity factors. Furthermore, as used herein, factors that are referred to as indicating "a number" of items or occurrences of an event may indicate an absolute quantity, a rate, or any other suitable format for indicating an amount.

Network 10 represents any suitable network operable to facilitate communication between the components of system 5. Network 10 may include any interconnecting system capable of transmitting audio, video, signals, data, messages, or any combination of the preceding. Network 10 may include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof operable to facilitate communication between the components.

Workstations 30 enable one or more users to monitor, administer, or otherwise interact with complexity analysis module 100. Workstations 30 may include one or more laptops, personal computers, monitors, display devices, handheld devices, smartphones, servers, user input devices, or other suitable components for enabling user interaction. In some embodiments, workstation 30 allows a user to control various aspects of the complexity analysis process. For example, workstation 30 may be used to set one or more raw complexity values 112. Such input may be used for ordinal or nominal complexity factors that utilize user assessment to determine raw complexity values. Workstation 30 may also allow a user to define one or more scoring metrics 114 or distribution types. For example, a user may manually set the ranges for a particular scoring metric 114. As another example, a user may set a distribution type to allow complexity analysis module 100 to automatically generate a scoring metric 114. In some embodiments, workstation 30 may allow a user to initialize, monitor, or review the complexity analysis process. Furthermore, users may use workstation 30 to perform various operations following the complexity scoring process such as, for example, publishing complexity scores, selecting one or more software applications for change management, or performing other complexity management procedures. Complexity analysis module 100 may include any suitable number, type, or configuration of workstation 30.

Complexity analysis module 100 represents any suitable components that facilitate the analysis of software application complexity in system 5. Complexity analysis module 100 may include a network server, remote server, mainframe, host computer, workstation, web server, personal computer, laptop, file server, tablet computer, smartphone, handheld device, database server, or any other suitable device operable to communicate with other devices and process data. In some embodiments, complexity analysis module 100 may execute any suitable operating system such as IBM's zSeries/Operating System (z/OS), MS-DOS, PC-DOS, MAC-OS, WINDOWS, UNIX, OpenVMS, Linux or any other appropriate operating systems, including future operating systems. The functions of complexity analysis module 100 may be performed by any suitable combination of one or more devices at one or more locations. In the embodiment utilizing servers, the servers may be public or private servers. The server may include one or more servers at the same or at remote locations. Complexity analysis module 100 may also include any suitable component that functions as any of the above components. For example, certain embodiments may utilize one or more virtual components, such as a virtual machine. In some embodiments, workstation 30 or systems of record 200 may be integrated with complexity analysis module 100, or they may operate as part of the same device or devices.

In the illustrated embodiment, complexity analysis module 100 includes network interface 102, processor 104, and memory 110.

Network interface 102 represents any suitable device operable to receive information from network 10, transmit information through network 10, perform suitable processing of the information, communicate to other devices, or any combination thereof. For example, network interface 102 may facilitate communication with systems of record 200 or workstation 30. As another example, network interface 102 may communicate information to one or more display devices to facilitate user interaction with or review of one or more components of complexity analysis module 100. Network interface 102 represents any port or connection, real or virtual, including any suitable hardware and/or software, including protocol conversion and data processing capabilities, to communicate through a LAN, WAN, or other communication system that allows complexity analysis module 100 to exchange information with network 10, other complexity analysis modules 100, systems of record 200, workstation 30, or other components of system 5.

Processor 104 communicatively couples to network interface 102 and memory 110 and controls the operation and administration of complexity analysis module 100 by processing information received from network interface 102 and memory 110. Processor 104 includes any hardware and/or software that operates to control and process information. In some embodiments, processor 104 may be a programmable logic device, a microcontroller, a microprocessor, any suitable processing device, or any suitable combination thereof. Processor 104 may execute one or more sets of instructions to facilitate the assessment of software application complexity. For example, processor 104 may execute metrics calculation logic 124 or complexity analysis logic 126. Processor 104 may execute any other suitable programs to facilitate the assessment of software application complexity such as, for example, user interface software to present one or more GUIs to a user.

Memory 110 stores, either permanently or temporarily, data, operational software, or other information for processor 104, other components of complexity analysis module 100, or other components of system 5. Memory 110 includes any one or a combination of volatile or nonvolatile local or remote devices suitable for storing information. For example, memory 110 may include random access memory (RAM), read only memory (ROM), flash memory, magnetic storage devices, optical storage devices, network storage devices, cloud storage devices, solid state devices, or any other suitable information storage device or a combination of these devices. Memory 110 may store information in one or more databases, file systems, tree structures, any other suitable storage system, or any combination thereof. Furthermore, different information stored in memory 110 may use any of these storage systems. Moreover, any information stored in memory may be encrypted or unencrypted, compressed or uncompressed, and static or editable. While illustrated as including particular modules, memory 110 may include any suitable information for use in the operation of complexity analysis module 100. In the illustrated embodiment, memory 110 includes raw complexity values 112, scoring metrics 114, preliminary complexity scores 116, weights 118, weighted complexity scores 120, total complexity scores 122, metrics calculation logic 124, and complexity analysis logic 126.

Raw complexity values 112 include any suitable values that quantify or otherwise indicate software application complexity. Raw complexity values 112 may include any suitable number, type, or configuration of values. In some embodiments, each software application has one or more sets of raw complexity values 112, and each raw complexity value 112 is associated with a particular complexity factor. Furthermore, raw complexity values 112 for a particular software application can be evaluated at different times to track the complexity of the software application over time. Complexity analysis module 100 may determine or store any suitable number of raw complexity values 112 for any suitable number of software applications. Specific examples of raw complexity values 112 are discussed below with respect to FIG. 2.

Figure 2:
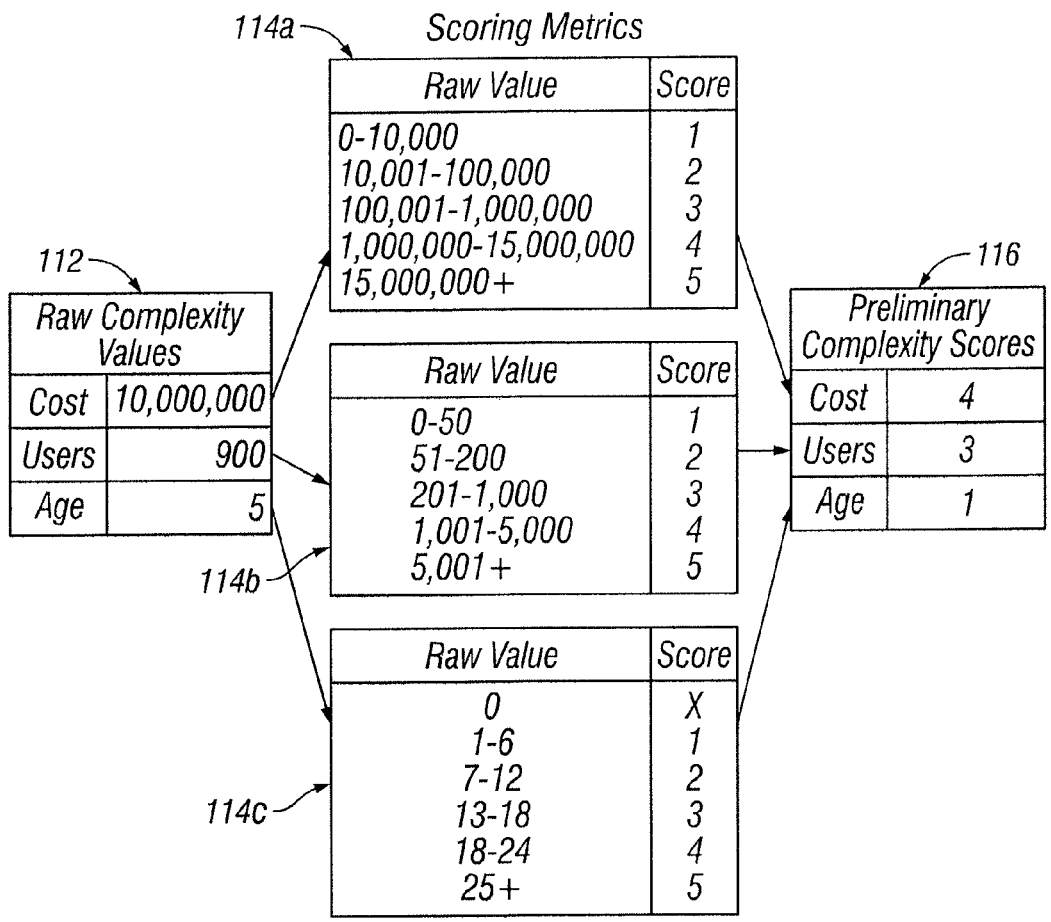
FIG. 2 illustrates calculations of example preliminary complexity scores in accordance with certain embodiments of the present disclosure.

Scoring metrics 114 include any suitable metric that defines how preliminary scores for respective complexity factors are calculated. Complexity analysis module 100 may use any suitable number, type, or configuration of score metrics 114. In some embodiments, one or more scoring metrics 114 are generated automatically by complexity analysis module 100 based on raw complexity values 112 from multiple applications, as explained further below with respect to metrics calculation logic 124. Each scoring metric 114 is associated with a particular complexity factor. For example, an age factor may be scored using one scoring metric 114 while a cost factor may be scored using a different scoring metric 114. An example of different scoring metrics being used for different complexity factors is shown in FIG. 2. Scoring metrics 114 may define the relationship between raw complexity scores and preliminary complexity scores in any suitable manner. For example, in certain embodiments, scoring metrics 114 map a raw complexity value (or range of values) to a particular score. In other embodiments, scoring metrics 114 define a formula that takes a raw complexity value as an input and outputs a preliminary complexity score 116. Any other suitable technique of mapping raw complexity values 112 to preliminary complexity scores 116 can be used. Furthermore, some embodiments incorporate weights into scoring metrics 114 such that different scoring metrics 114 have different minimum or maximum values. Such weighted scoring metrics may provide a simplified mechanism for emphasizing or deemphasizing one or more complexity factors when calculating total complexity scores 122. Embodiments using such scoring metrics 114 may not explicitly utilize weights 118 or weighted complexity scores 120.

Certain scoring metrics 114 may indicate that particular raw complexity values should not be scored at all. For example, if a raw complexity value of zero for a particular complexity factor is not indicative of complexity, such values may trigger complexity analysis module 100 to omit that complexity factor from its analysis of that software application. As a specific example, for complexity factors that cannot meaningfully have a zero as a raw complexity value (e.g., an instantiation factor or a hardware factor), a zero may indicate user error, or it may indicate that the software application simply has not been put into use yet. Zeros in such cases would not meaningfully connote low complexity, so complexity analysis module 100 may omit scoring of that complexity factor. Total complexity scores 122 may be normalized (e.g., by presenting the total complexity score as a percentage of total possible points) so that such totals are not artificially reduced relative to other totals that incorporate preliminary complexity scores 116 for all complexity factors. As another example, certain complexity factors may be flagged to indicate that development-stage applications should not be scored. For example, a production age factor may not provide meaningful complexity information for software applications that are not yet in production, so embodiments using this complexity factor may omit production age scoring for all software applications that are not yet in production. Again, total complexity scores 122 can be normalized so that the total indicates the complexity score relative to the maximum possible score for that software application. Such normalization allows different types of software applications to be more meaningfully compared despite having been scored using different complexity factors. As used herein, normalizing refers to any suitable method of adjusting values having different scales to a notionally common scale.

Preliminary complexity scores 116 may be any suitable data indicating scores for particular complexity factors. Preliminary complexity scores 116 may include any suitable number, type, or configuration of values. In some embodiments, each software application has one or more sets of preliminary complexity scores 116, and each preliminary complexity score 116 is associated with a particular complexity factor. Furthermore, preliminary complexity scores 116 for a particular software application can be evaluated at different times to track the complexity of the software application over time. Complexity analysis module 100 may determine or store any suitable number of preliminary complexity scores 116 for any suitable number of software applications. As explained above, in certain embodiments, preliminary complexity scores 116 are implicitly weighted due to different scales inherent in scoring metrics 114 (e.g., different maximum values). In other embodiments, preliminary complexity scores 116 may be explicitly weighted during subsequent processing. Specific examples of preliminary complexity scores 116 are discussed below with respect to FIGS. 2 and 3.

Weights 118 may be any suitable factor that determines the extent to which a particular complexity factor contributes to total complexity scores 122. Complexity analysis module 100 may use any suitable number or type of weights 118 in certain embodiments. For example, in some embodiments preliminary complexity scores 116 are multiplied by their respective weight to generate a weighted complexity score 120. Other embodiments may use any suitable type of weight to emphasize or deemphasize certain complexity factors. Some embodiments may omit weights 118 entirely.

Weighted complexity scores 120 may be any complexity scores that have been adjusted to emphasize one or more complexity factors. Complexity analysis module 100 may use any suitable number, type, or configuration of weighted complexity scores 120. In embodiments where scoring metrics 114 already incorporate the desired weighting for each complexity factor, as explained above, weighted complexity scores 120 may be the same as preliminary complexity scores 116. Weighted complexity scores 120 for a particular software application are summed or otherwise combined to generate total complexity score 122. Specific examples of weighted complexity scores 120 are discussed below with respect to FIG. 3.

Total complexity scores 122 may be any scores indicating the complexity of software applications based on the analysis of multiple complexity factors. Each total complexity score 122 is associated with a particular software application. Furthermore, multiple total complexity scores 122 may be calculated for a particular application to track to the change in complexity over time. Total complexity scores 122 may be normalized to account for scores that have omitted one or more complexity factors. Such normalization may enable complexity comparisons between disparate software applications that were scored using different complexity factors. Complexity analysis module 100 may compare total complexity scores 122 of different software applications to identify low or high complexity applications for subsequent mitigation.

Metrics calculation logic 124 represents any suitable set of instructions, logic, or code embodied in a computer-readable storage medium and operable to facilitate the generation of one or more scoring metrics 114. Metrics calculation logic 124 may be stored in memory 110 or another memory associated with complexity analysis module 100. Metrics calculation logic 124, or portions thereof, may also be embodied in hardware associated with complexity analysis module 100 or other components of system 5. Furthermore, the components of metrics calculation logic 124 may be stored in the same or different memories of the same or different complexity analysis module 100. Various components of metrics calculation logic 124 may also be stored in different components of system 5. Metrics calculation logic 124 may be implemented as an application, a component of an application, a plugin for an existing application, a script, and/or any suitable component.

In an exemplary embodiment of operation, metrics calculation logic 124 generates one or more scoring metrics 114 based on raw complexity values 112 from multiple applications. For example, metrics calculation logic 124 may calculate a scoring metric 114 for a particular complexity factor based on raw complexity values 112 for that complexity factor from all software applications (or a subset thereof). Raw complexity values from multiple applications that serve as the basis for calculating a scoring metric 114 may be referred to as "initial" raw values. In some embodiments, a user specifies a distribution type for a particular complexity factor or scoring metric 114 that indicates what the distribution of preliminary scores for that complexity factor should be. Distribution types may include linear, bell curve, inverted bell curve, or any other suitable type of data distribution. Metrics calculation logic 124 then generates a scoring metric 114 that allows the raw complexity values 112 from the multiple software applications to fit the desired distribution. For example, a linear distribution type would result in a scoring metric 114 that causes the raw complexity scores 112 to be approximately evenly distributed across the available preliminary complexity scores. A bell curve distribution type would result in a scoring metric 114 that causes the raw complexity scores 112 to be clustered toward the middle of the scoring range. An inverted bell curve distribution type would result in a scoring metric 114 that causes the raw complexity scores 112 to be more heavily distributed at the lower and upper ends of the scoring range. Any suitable distribution type may be specified to provide the desired distribution of data.

Complexity analysis logic 126 represents any suitable set of instructions, logic, or code embodied in a computer-readable storage medium and operable to calculate overall complexity scores using multiple complexity factors. Complexity analysis logic 126 may be stored in memory 110 or another memory associated with complexity analysis module 100. Complexity analysis logic 126, or portions thereof, may also be embodied in hardware associated with complexity analysis module 100 or other components of system 5. Furthermore, the components of complexity analysis logic 126 may be stored in the same or different memories of the same or different complexity analysis modules 100. Various components of complexity analysis logic 126 may also be stored in different components of system 5. Complexity analysis logic 126 may be implemented as an application, a component of an application, a plugin for an existing application, a script, and/or any suitable component. As a specific example, complexity analysis logic 126 may be implemented as a macro in a spreadsheet program (such as, for example, EXCEL).

Systems of record 200 represent any suitable components that are operable to store data associated with software applications. Systems of record 200 may include a network server, remote server, mainframe, host computer, workstation, web server, personal computer, file server, database server, or any other suitable device operable to communicate with other devices and store data. In some embodiments, systems of record 200 may execute any suitable operating system such as IBM's zSeries/Operating System (z/OS), MS-DOS, PC-DOS, MAC-OS, WINDOWS, UNIX, OpenVMS, Linux or any other appropriate operating systems, including future operating systems. The functions of a system of record 200 may be performed by any suitable combination of one or more servers or other components at one or more locations. In the embodiment using servers, the servers may be public or private servers, and each server may be a virtual or physical server. The server may include one or more servers at the same or at remote locations. For example, a system of record 200 may operate logically as a single server while operating across two or more physical servers. System of record 200 may also include any suitable component that functions as a server. In some embodiments, one or more portions of complexity analysis module 100 or workstation 30 may be integrated with systems of record 200, or they may operate as part of the same device or devices.

In the illustrated embodiment, system of record 200a includes network interface 202a, processor 204a, and memory 210a. Similarly, system of record 200b includes network interface 202b, processor 204b, and memory 210b. Network interfaces 202, processors 204, and memory 210 can have any structure, type, or configuration discussed above with respect to network interface 102, processor 104, and memory 110, respectively. System 5 can include any suitable number, type, or configuration of systems of record 200.

In the illustrated embodiment, memories 210a and 210b include application data 212a and 212b, respectively. Application data 212 can be any data associated with a software application. Such data can include source code, configuration files, application state, application meta-data, application logs, or any other type of data associated with the software application. Application data 212 associated with a particular software applications can be stored on a particular system of record 200 or distributed across multiple systems of record 210. Furthermore, a single system of record may include application data 212 that is associated with multiple software applications. Application data 212 can be retrieved by complexity analysis module 100 at any suitable time (or at different times) to facilitate the determination of raw complexity values 112. A raw complexity value 112 may be a direct copy of or a reference to a particular portion of application data 212, or it may be converted in any suitable manner.

In an exemplary embodiment of operation, complexity analysis logic 126 scores the complexity of a software application based on application data 212 pulled from systems of record 200. Complexity application logic 126 accesses application data 212 associated with the software application to determine raw complexity values 112 for various complexity factors. Complexity application logic 126 then applies scoring metrics 114 to raw complexity values 112 to calculate preliminary complexity scores 116. In some embodiments, complexity application logic 126 then applies weights 118 to the respective preliminary complexity scores 116 to calculate weighted complexity scores 120, which are then combined to calculate a total complexity score 122 for the software application. In alternative embodiments, scoring metrics 114 already implicitly weight the various complexity factors, so preliminary complexity scores 112 are combined to calculate a total complexity score 122 for the software application. Total complexity score 122 may then be normalized so that the score reflects the percentage of the total possible points or otherwise utilizes a common scale. This process can be repeated for different software applications, and complexity analysis logic 126 may then compare total complexity scores 122 to determine which software applications have relatively lower or higher complexities. Complexity analysis logic 126 may also publish complexity scores, identify or otherwise flag software applications that are above a threshold complexity value, or otherwise facilitate complexity management procedures.

Modifications, additions, or omissions may be made to system 5 without departing from the scope of the invention. For example, system 5 may implement computer assessment procedures different from or in addition to those described herein. As another example, multiple complexity analysis modules 100 may operate in parallel to facilitate complexity analysis. As yet another example, metrics calculation logic 124 or complexity analysis logic 126 may be configurable by a user. System 5 may include any number of networks 10, workstations 30, complexity analysis modules 100, or systems of record 200. Any suitable logic may perform the functions of system 5 and the components within system 5.

FIG. 2 illustrates calculations of example preliminary complexity scores 116 based on example raw complexity values 112 and example scoring metrics 114. The illustrated embodiment shows the evaluation and preliminary scoring of several complexity factors, including cost, users, and age. These complexity factors are used merely as examples, and other embodiments may use some, all, or none of the complexity factors shown in FIG. 2.

In FIG. 2, raw complexity values 112 for cost, users, age are 10,000,000; 900; and 5, respectively. These values are merely used as examples. Scoring metric 114a shows example ranges used for scoring raw cost values. Scoring metric 114b shows example ranges used for scoring raw user values. Scoring metric 114c shows example ranges used for scoring raw age values. Furthermore, scoring metric 114c associates no score with a raw complexity value of 0, indicating that the age factor should not be factored into total complexity score 112 when the software application has a raw age value of 0. The particular ranges and scores of scoring metrics 114a-114c are used merely as examples, and any suitable ranges and scores may be used. Other embodiments may use any type of scoring metric discussed above with respect to FIG. 1.

Preliminary complexity scores 116 are calculated based on scoring metrics 114. As shown in FIG. 2, the preliminary complexity scores are calculated by applying scoring metrics 114 to raw complexity values 112, and each complexity factor is given a preliminary complexity score based on the range in which the raw complexity value falls. Other embodiments may calculate preliminary complexity scores using any suitable technique. For example, a scoring metric 114 for a particular complexity factor may be a mathematical formula that can be evaluated as a function of a raw complexity value 112 to provide a preliminary complexity score 116.

Figure 3:
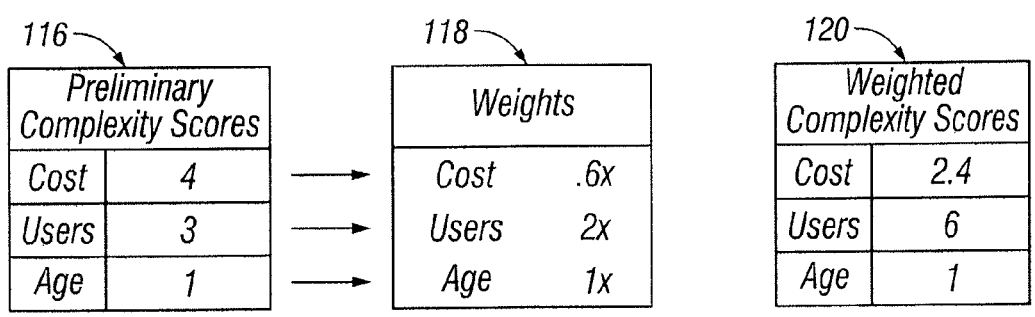
FIG. 3 illustrates calculations of example weighted complexity scores in accordance with certain embodiments of the present disclosure.

FIG. 3 illustrates calculations of example weighted complexity scores 120 based on example preliminary complexity scores 116 and example weights 118. As in FIG. 2, FIG. 3 shows the calculation of weighted scores for several complexity factors, including cost, users, and age. Again, the illustrated complexity factors are used merely as examples, and other embodiments may use some, all, or none of the complexity factors shown in FIG. 3.

In FIG. 3, preliminary complexity scores for cost, users, age are 4, 3, and 1, respectively. These values are merely used as examples. Weights 118 show example weights used for calculating weighted complexity scores 120. In the illustrated embodiment, preliminary complexity scores 116 are multiplied by their respective weights 118 to generate weighted complexity scores 120. Various embodiments may use any type of weight 118 discussed above with respect to FIG. 1, while other embodiments may forgo the use of weights 118 altogether. Furthermore, in some embodiments, weights 118 may be effectively incorporated into scoring metrics 114. For example, scoring metrics 114 used for different complexity factors may have different maximum or minimum values to implicitly weigh preliminary complexity scores 116. In embodiments using formulas for scoring metrics 114 rather than ranges, similar results can also be achieved by adjusting the formulas themselves to magnify the effects of certain complexity factors relative to other complexity factors in the calculation of total complexity scores 122.

Weighted complexity scores 120 can be summed or otherwise combined to calculate total complexity score 122. For example, in the illustrated embodiment, weighted complexity scores 120 yield a summed total complexity score of 9.4 out of a total possible score of 18. Total complexity score 122 can also be normalized to show the total score relative to the total possible score for the software application. For example, given scoring metric 114c of FIG. 2, a software application having no users (e.g., a software application that is not designed for user interaction) could receive a normalized score showing the total score out of a possible 13 points. Similar normalization can be used with particular software applications or with types of software applications that are flagged to have one or more complexity factors ignored. For example, a production age complexity factor that indicates the amount of time a software application has been in production can be flagged so that software applications in the development stage are not scored for production age, which might otherwise skew its total complexity score downward.

Figure 4:
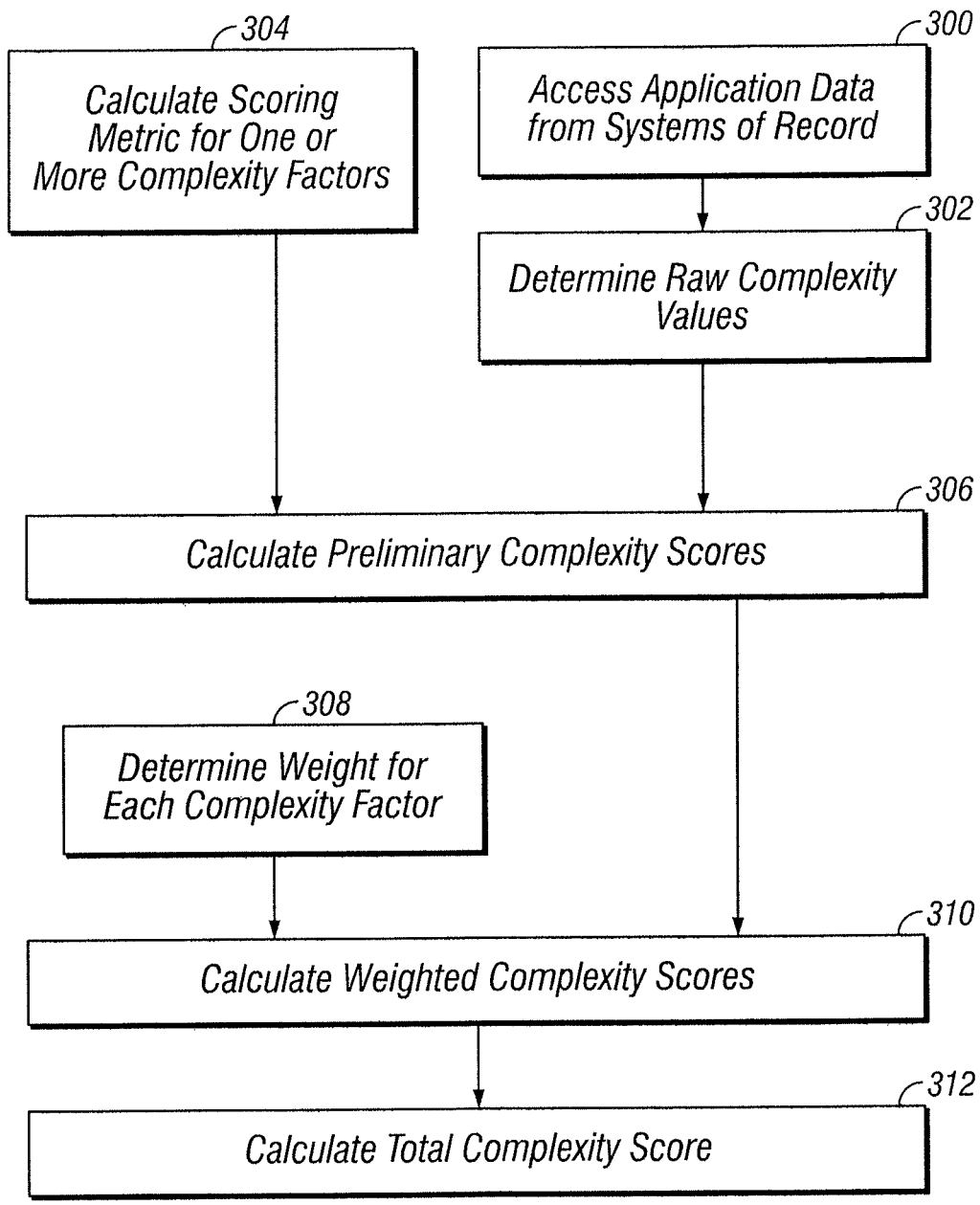
FIG. 4 illustrates an example complexity analysis sequence.

FIG. 4 illustrates an example software application complexity analysis sequence that may be performed by complexity analysis module 116. This sequence primarily describes the scoring of software application complexity for a single software application at a particular point in time. However, this sequence may be performed any suitable number of times for any suitable number of applications.

At step 300, complexity analysis module 100 accesses application data 212 related to a particular software application from one or more systems of record 200. The relevant data may be stored on a single system of record 200 or on multiple systems of record 200. Complexity analysis module 100 may access application data 212 immediately before calculating the complexity scores for the software application, or complexity analysis module 100 may access application data 212 at an earlier time, storing the data for later use.

At step 302, complexity analysis module 100 determines raw complexity values 112. In some embodiments, complexity analysis module 100 copies one or more portions of application data 212 to memory 110 as raw complexity values 112. In other embodiments, raw complexity values 112 are based on application data 212 but are not direct copies. Each raw complexity value 112 is associated with a respective complexity factor.

At step 304, complexity analysis module 100 calculates scoring metrics 114. In some embodiments, scoring metrics are input directly by a user. In other embodiments, one or more scoring metrics are automatically generated by complexity analysis module 100 based on previously determined raw complexity values 112. For example, complexity analysis module 100 can calculate a scoring metric 114 for a particular complexity factor based on raw complexity values 112 for that complexity factor from all software applications (or a subset thereof). In particular embodiments, a user specifies a distribution type for a particular complexity factor or scoring metric 114 that indicates the desired distribution of preliminary complexity scores 116. Complexity analysis module 100 then calculates a scoring metric 114 that causes the raw complexity values 112 from the multiple software applications to fit the desired distribution. To facilitate this calculation, complexity analysis module 100 may compute various statistics on the initial raw values such as, for example, mean, median, mode, standard deviation, or other statistical data.

At step 306, complexity analysis module 100 calculates preliminary complexity scores 116. Complexity analysis module 100 may omit scoring of certain complexity factors in certain circumstances. For example, a flag or other setting may indicate that a particular complexity factor should not be scored for this software application. For complexity factors that are scored, complexity analysis module 100 applies the scoring metric 114 for each complexity factor to the associated raw complexity value to determine each preliminary complexity score. Applying scoring metrics 114 may involve mapping raw complexity values 112 to preliminary complexity scores 116 based on ranges specified by scoring metrics 114, computing preliminary complexity scores 116 based on formulas specified by scoring metrics 114, or any other suitable type of calculation.

At steps 308, complexity analysis module 100 determines weights 118 for each complexity factor. Weights may be input by a user or otherwise configured directly. In other embodiments, weights can be calculated automatically based on other data. For example, a user may specify an order of application complexity for previously analyzed software applications, and CAM 100 may calculate a weight scheme that achieves the specified complexity order. Weights 118 from this scheme may then be used in subsequent calculations. Still other embodiments may omit explicit weights 118 entirely, as explained above.

At step 310, complexity analysis module 100 calculates weighted complexity scores 120. In some embodiments, the preliminary complexity scores calculated during step 306 may be inherently weighted by virtue of implicitly weighted scoring metrics. In other embodiments, complexity analysis module 100 applies the weights calculated during step 308 to the preliminary complexity scores calculated during step 306. For example, in some embodiments, complexity analysis module 100 multiplies each preliminary complexity score 116 by its respective weight.

At step 312, complexity analysis module 100 calculates a total complexity score 122 for the software application. In some embodiments, total complexity score 122 is calculated by summing weighted complexity scores 120 (or preliminary complexity scores 116). Total complexity score 122 may also be normalized so that the score reflects the percentage of the total possible points or otherwise uses a common scale. This normalization allows comparison between disparate software applications that were scored using different complexity factors.

One or more steps of this sequence can be repeated for different software applications. Complexity analysis module 100 can then compare total complexity scores 122 from different applications to determine which software applications have relatively lower or higher complexities. This analysis may improve the ability to target particular software applications for complexity mitigation. Complexity analysis module 100 may also publish complexity scores, identify or otherwise flag software applications that are above a threshold complexity value, or otherwise facilitate complexity management procedures.

Various embodiments may perform some, all, or none of the steps described above. For example, certain embodiments may omit steps 300, 304, 308, or 310 under certain conditions, or they may omit these steps entirely. For example, certain embodiments may incorporate weights into scoring metrics 114, in which case steps 308 and 310 can be omitted and total complexity scores 122 can be calculated directly from preliminary complexity values 116. Furthermore, certain embodiments may perform these steps in different orders or in parallel. Moreover, one or more steps may be repeated. For example, this sequence may be performed for multiple software applications or for the same software application at different times. While the above steps are described as being performed by complexity analysis module 100, any suitable component of system 5 may perform one or more steps of the sequence.

Herein, "or" is inclusive and not exclusive, unless expressly indicated otherwise or indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, "A and B" means "A and B, jointly or severally," unless expressly indicated otherwise or indicated otherwise by context.

Particular embodiments may be implemented as hardware, software, or a combination of hardware and software. As an example and not by way of limitation, one or more computer systems may execute particular logic or software to perform one or more steps of one or more processes described or illustrated herein. Software implementing particular embodiments may be written in any suitable programming language (which may be procedural or object oriented) or combination of programming languages, where appropriate. In various embodiments, software may be stored in computer-readable storage media. Any suitable type of computer system (such as a single- or multiple-processor computer system) or systems may execute software implementing particular embodiments, where appropriate. A general-purpose computer system may execute software implementing particular embodiments, where appropriate. In certain embodiments, portions of logic may be transmitted and or received by a component during the implementation of one or more functions.

Herein, reference to a computer-readable storage medium encompasses one or more non-transitory, tangible, computer-readable storage medium possessing structures. As an example and not by way of limitation, a computer-readable storage medium may include a semiconductor-based or other integrated circuit (IC) (such as, for example, an FPGA or an application-specific IC (ASIC)), a hard disk, an HDD, a hybrid hard drive (HHD), an optical disc, an optical disc drive (ODD), a magneto-optical disc, a magneto-medium, a solid-state drive (SSD), a RAM-drive, or another suitable computer-readable storage medium or a combination of two or more of these, where appropriate. Herein, reference to a computer-readable storage medium excludes any medium that is not eligible for patent protection under 35 U.S.C. §101. Herein, reference to a computer-readable storage medium excludes transitory forms of signal transmission (such as a propagating electrical or electromagnetic signal per se) to the extent that they are not eligible for patent protection under 35 U.S.C. §101. A computer-readable non-transitory storage medium may be volatile, non-volatile, or a combination of volatile and non-volatile, where appropriate.

This disclosure contemplates one or more computer-readable storage media implementing any suitable storage. In particular embodiments, a computer-readable storage medium implements one or more portions of interface 102, one or more portions of processor 104, one or more portions of memory 110, or a combination of these, where appropriate. Analogous portions of systems of record 200 may also be configured in this manner. In particular embodiments, a computer-readable storage medium implements RAM or ROM. In particular embodiments, a computer-readable storage medium implements volatile or persistent memory.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. For example, various embodiments may perform all, some, or none of the steps described above. Various embodiments may also perform the functions described in various orders.

Various embodiments disclosed herein may be used together in a variety of combinations. In various embodiments, complexity analysis module 100 may have different types, numbers, and configurations of interface 102, processor 104, memory 110, or any components thereof. Analogous portions of systems of record 200 may also be configured in this manner. Various embodiments may utilize different numbers or types of complexity factors, scoring metrics 114, or weights 118.

Although the present invention has been described above in connection with several embodiments; changes, substitutions, variations, alterations, transformations, and modifications may be suggested to one skilled in the art, and it is intended that the present invention encompass such changes, substitutions, variations, alterations, transformations, and modifications as fall within the spirit and scope of the appended claims.

What is claimed is:

1. An apparatus for analyzing software application complexity based on a plurality of complexity factors, the apparatus comprising:
   a memory operable to store:
      a plurality of raw complexity values associated with a software application, wherein each raw complexity value associated with a respective complexity factor from a plurality of complexity factors associated with the software application;
      a plurality of scoring metrics that map raw complexity values to preliminary complexity scores, wherein each scoring metric is associated with a complexity factor from the plurality of complexity factors; and
   a plurality of preliminary complexity scores associated with the software application; and a processor communicatively coupled to the memory and operable to:
    determine the plurality of raw complexity values by determining a respective raw complexity value for each of the complexity factors from the plurality of complexity factors;
    calculate the plurality of preliminary complexity scores by calculating a respective preliminary complexity score for each of the complexity factors using the scoring metric and the raw complexity value associated with each of the complexity factors; and
    calculate a total complexity score for the software application based at least on the plurality of preliminary complexity scores, wherein calculating the total complexity score comprises summing the plurality of preliminary complexity scores.

2. The apparatus of claim 1, wherein the processor is operable to calculate the total complexity score by:
    determining a respective weight for each complexity factor;
    calculating a weighted complexity score for each complexity factor, each weighted complexity score calculated by applying the respective weight to the respective preliminary complexity score for each complexity factor; and
    calculating the total complexity score based at least on the plurality of weighted complexity scores.

3. The apparatus of claim 1, wherein the plurality of complexity factors comprises one or more of the following complexity factors:
    a user factor indicating a number of users associated with a software application;
    an age factor indicating an age of a software application;
    an error factor indicating a number of errors caused by a software application;
    a transaction factor indicating a number of transactions processed by a software application;
    a change factor indicating a number of changes to code of a software application after entering production;
    an instantiation factor indicating a number of instances of a software application;
    an affected applications factor indicating a number of software applications affected by changes to a software application;
    a cost factor indicating a monetary cost associated with a software application;
    a hardware factor indicating a number of hardware devices utilizing a software application; and
    a resource usage factor indicating an amount of computing resources used by a software application.

4. The apparatus of claim 1, wherein the processor is further operable to calculate one or more of the scoring metrics based at least on raw complexity values associated with a plurality of software applications.

5. The apparatus of claim 4, wherein calculating the one or more scoring metrics comprises calculating a first scoring metric by:
    determining a distribution type associated with a first complexity factor, the distribution type indicating a distribution of values;
    accessing a plurality of initial raw complexity values associated with the first complexity factor; and
    calculating the first scoring metric such that scoring the initial raw complexity values based on the first scoring metric results in scores having a distribution substantially similar to the distribution type.

6. The apparatus of claim 1, wherein the plurality of scoring metrics comprises a first scoring metric, the first scoring metric comprising a plurality of ranges, each range mapped to a score.

7. The apparatus of claim 1, wherein the processor is further operable to determine that a first complexity factor of the plurality of complexity factors should be excluded from the total complexity score, wherein the total complexity score is not based on the respective preliminary complexity score associated with the first preliminary complexity factor.

8. A method for analyzing the complexity of a software application based on a plurality of complexity factors, the method comprising:
    determining, by a processor of a first computer system, a plurality of raw complexity values by determining a respective raw complexity value for each complexity factor from a plurality of complexity factors associated with the software application, wherein each complexity factor is associated with a respective scoring metric that maps raw complexity values to preliminary complexity scores;
    calculating, by the processor, a plurality of preliminary complexity scores for the software application by calculating a respective preliminary complexity score for each of the complexity factors using the scoring metric and raw complexity value associated with each of the complexity factors; and
    calculating, by the processor, a total complexity score for the software application based at least on the plurality of preliminary complexity scores, wherein calculating the total complexity score comprises summing the plurality of preliminary complexity scores.

9. The method of claim 8, wherein calculating the total complexity score comprises:
    determining, by the processor, a respective weight for each complexity factor;
    calculating, by the processor, a weighted complexity score for each complexity factor, each weighted complexity score calculated by applying the respective weight to the respective preliminary complexity score for each complexity factor; and
    calculating, by the processor, the total complexity score based at least on the plurality of weighted complexity scores.

10. The method of claim 8, wherein the plurality of complexity factors comprises one or more of the following complexity factors:
    a user factor indicating a number of users associated with the software application;
    an age factor indicating an age of the software application;
    an error factor indicating a number of errors caused by the software application;
    a transaction factor indicating a number of transactions processed by the software application;
    a change factor indicating a number of changes to code of the software application after entering production;
    an instantiation factor indicating a number of instances of the software application;
    an affected applications factor indicating a number of software applications affected by changes to the software application;
    a cost factor indicating a monetary cost associated with the software application;
    a hardware factor indicating a number of hardware devices utilizing the software application; and
    a resource usage factor indicating an amount of computing resources used by the software application.

11. The method of claim 8, further comprising calculating, by the processor, one or more of the scoring metrics based at least on raw complexity values associated with a plurality of software applications.

12. The method of claim 11, wherein calculating the one or more scoring metrics comprises calculating a first scoring metric by:
- determining, by the processor, a distribution type associated with a first complexity factor, the distribution type indicating a distribution of values;
- accessing, by the processor, a plurality of initial raw complexity values associated with the first complexity factor; and
- calculating, by the processor, the first scoring metric such that scoring the initial raw complexity values based on the first scoring metric results in scores having a distribution substantially similar to the distribution type.

13. The method of claim 8, wherein the plurality of scoring metrics comprises a first scoring metric, the first scoring metric comprising a plurality of ranges, each range mapped to a score.

14. The method of claim 8, further comprising determining, by the processor, that a first complexity factor of the plurality of complexity factors should be excluded from the total complexity score, wherein the total complexity score is not based on the respective preliminary complexity score associated with the first preliminary complexity factor.

15. A computer readable storage medium comprising logic for analyzing the complexity of a software application based on a plurality of complexity factors, the logic operable, when executed by a processor, to:
- determine a plurality of raw complexity values by determining a respective raw complexity value for each of the complexity factor from the plurality of complexity factors associated with the software application, wherein each complexity factor is associated with a respective scoring metric that maps raw complexity values to preliminary complexity scores;
- calculate a plurality of preliminary complexity scores for the software application by calculating a respective preliminary complexity score for each of the complexity factors using the scoring metric and raw complexity value associated with each of the complexity factors;
- calculate a total complexity score for the software application based at least on the plurality of preliminary complexity scores, wherein calculating the total complexity score comprises summing the plurality of preliminary scores.

16. The medium of claim 15, wherein calculating the total complexity score comprises:
- determining a respective weight for each complexity factor;
- calculating a weighted complexity score for each complexity factor, each weighted complexity score calculated by applying the respective weight to the respective preliminary complexity score for each complexity factor; and
- calculating the total complexity score based at least on the plurality of weighted complexity scores.

17. The medium of claim 15, wherein the plurality of complexity factors comprises one or more of the following complexity factors:
- a user factor indicating a number of users associated with the software application;
- an age factor indicating an age of the software application;
- an error factor indicating a number of errors caused by the software application;
- a transaction factor indicating a number of transactions processed by the software application;
- a change factor indicating a number of changes to code of the software application after entering production;
- an instantiation factor indicating a number of instances of the software application;
- an affected applications factor indicating a number of software applications affected by changes to the software application;
- a cost factor indicating a monetary cost associated with the software application;
- a hardware factor indicating a number of hardware devices utilizing the software application; and
- a resource usage factor indicating an amount of computing resources used by the software application.

18. The medium of claim 15, wherein the logic is further operable, when executed by the processor, to calculate one or more of the scoring metrics based at least on raw complexity values associated with a plurality of software applications.

19. The medium of claim 18, wherein calculating the one or more scoring metrics comprises calculating a first scoring metric by:
- determining a distribution type associated with a first complexity factor, the distribution type indicating a distribution of values;
- accessing a plurality of initial raw complexity values associated with the first complexity factor; and
- calculating the first scoring metric such that scoring the initial raw complexity values based on the first scoring metric results in scores having a distribution substantially similar to the distribution type.

20. The medium of claim 15, wherein the plurality of scoring metrics comprises a first scoring metric, the first scoring metric comprising a plurality of ranges, each range mapped to a score.

* * * * *